(12) United States Patent
Schulz et al.

(10) Patent No.: US 11,965,066 B2
(45) Date of Patent: Apr. 23, 2024

(54) THERMOPLASTIC COMPOSITIONS WITH IMPROVED UV RESISTANCE

(71) Applicant: INEOS STYROLUTION GROUP GMBH, Frankfurt am Main (DE)

(72) Inventors: Tobias Schulz, Cologne (DE); Christian Ruthard, Mainz (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 635 days.

(21) Appl. No.: 17/251,324

(22) PCT Filed: Jun. 11, 2019

(86) PCT No.: PCT/EP2019/065109
§ 371 (c)(1),
(2) Date: Dec. 11, 2020

(87) PCT Pub. No.: WO2019/243105
PCT Pub. Date: Dec. 26, 2019

(65) Prior Publication Data
US 2021/0261740 A1    Aug. 26, 2021

(30) Foreign Application Priority Data

Jun. 18, 2018  (EP) .................................. 18178200

(51) Int. Cl.
| | | |
|---|---|---|
| C08L 25/12 | (2006.01) | |
| C08F 220/18 | (2006.01) | |
| C08J 3/00 | (2006.01) | |
| C08J 3/20 | (2006.01) | |
| C08K 3/013 | (2018.01) | |
| C08K 5/00 | (2006.01) | |
| C08L 51/00 | (2006.01) | |
| C08L 83/04 | (2006.01) | |
| C08L 83/10 | (2006.01) | |

(52) U.S. Cl.
CPC ......... *C08J 3/005* (2013.01); *C08F 220/1804* (2020.02); *C08J 3/20* (2013.01); *C08K 3/013* (2018.01); *C08K 5/0041* (2013.01); *C08L 25/12* (2013.01); *C08L 51/003* (2013.01); *C08L 83/04* (2013.01); *C08L 83/10* (2013.01); *C08L 2201/08* (2013.01); *C08L 2201/52* (2013.01); *C08L 2203/30* (2013.01); *C08L 2205/025* (2013.01); *C08L 2205/035* (2013.01); *C08L 2205/18* (2013.01); *C08L 2205/22* (2013.01)

(58) Field of Classification Search
None
See application file for complete search history.

(56) References Cited

U.S. PATENT DOCUMENTS

| | | |
|---|---|---|
| 3,553,167 A | 1/1971 | Schnell et al. |
| 4,075,173 A | 2/1978 | Maruyama et al. |
| 4,156,069 A | 5/1979 | Prevorsek et al. |
| 4,224,419 A | 9/1980 | Swoboda et al. |
| 4,269,964 A | 5/1981 | Freitag et al. |
| 4,311,823 A | 1/1982 | Imai et al. |
| 4,334,053 A | 6/1982 | Freitag et al. |
| 4,605,699 A | 8/1986 | Mitulla et al. |
| 4,634,734 A | 1/1987 | Hambrecht et al. |
| 4,692,486 A | 9/1987 | Gugumus |
| 4,788,253 A | 11/1988 | Hambrecht et al. |
| 4,982,014 A | 1/1991 | Freitag et al. |
| 5,981,661 A | 11/1999 | Liao et al. |
| 9,701,813 B2 | 7/2017 | Minkwitz |
| 11,667,780 B2 * | 6/2023 | Schulz ................ C08J 3/226 524/504 |
| 2006/0124904 A1 | 6/2006 | Gugumus |
| 2008/0242779 A1 | 10/2008 | Gaggar et al. |
| 2016/0297957 A1 | 10/2016 | Boeckmann et al. |
| 2017/0145201 A1 | 5/2017 | Boeckmann et al. |

FOREIGN PATENT DOCUMENTS

| | | |
|---|---|---|
| CA | 1173998 A | 9/1984 |
| CN | 105860316 A | 8/2016 |
| CN | 108164857 A | 6/2018 |
| DE | 1495626 B1 | 6/1971 |
| DE | 2232877 A1 | 1/1974 |
| DE | 2703376 A1 | 8/1977 |
| DE | 2714544 A1 | 10/1977 |
| DE | 2826925 A1 | 1/1980 |
| DE | 2842005 A1 | 4/1980 |
| DE | 3000610 A1 | 7/1980 |
| DE | 2940024 A1 | 4/1981 |
| DE | 3007934 A1 | 9/1981 |
| DE | 3149358 A1 | 6/1983 |
| DE | 3414118 A1 | 10/1985 |
| DE | 3832396 A1 | 2/1990 |
| DE | 10316198 A1 | 10/2003 |
| EP | 0369203 A2 | 5/1990 |
| EP | 0369204 A2 | 5/1990 |
| EP | 0653447 A1 | 5/1995 |
| EP | 1153950 A1 | 11/2001 |
| EP | 1529810 A1 | 5/2005 |
| EP | 1983018 A1 | 10/2008 |
| EP | 2436736 A1 | 4/2012 |
| EP | 3219755 A1 | 9/2017 |

(Continued)

OTHER PUBLICATIONS

Lange, "Bestimmung von Teilchengroben aus Trubung und Brechungsinkrement," Kolloid-Z. u. Z. Polymere, Band 223, Heft 1, 1967, pp. 24-30; see specification for relevancy at p. 6 lines 18-19.

(Continued)

*Primary Examiner* — Richard A Huhn
(74) *Attorney, Agent, or Firm* — RAPHAEL BELLUM PLLC

(57) ABSTRACT

The present invention relates to a method of improving UV resistance of a vinylaro-maticmolding mass by means of compounding a thermoplastic polymer composition which comprises at least one graft copolymer with an organopolysiloxane compound and optionally further components.

15 Claims, No Drawings

(56) References Cited

FOREIGN PATENT DOCUMENTS

| | | | | |
|---|---|---|---|---|
| JP | H0450252 A | 2/1992 | | |
| KR | 101750603 B1 | 7/2017 | | |
| WO | 2015/078751 A1 | 6/2015 | | |
| WO | 2015/132190 A1 | 9/2015 | | |
| WO | 2015/150223 A1 | 10/2015 | | |
| WO | 2019/020677 A1 | 1/2019 | | |
| WO | 2019/020680 A1 | 1/2019 | | |
| WO | WO-2019020677 A1 * | 1/2019 | ............. | C08G 77/04 |
| WO | WO-2019020680 A1 * | 1/2019 | ............. | C08J 3/005 |

OTHER PUBLICATIONS

Scholtan et al., "Bestimmung der Teilchengrobenverteilung von Latices mit der Ultrazentrifuge," Kolloid-Z. u. Z. Polymere 250, 1972, pp. 782-796; see specification for relevancy at p. 6, lines 19-20.

W. Wohlleben, H. Schuch, "Measurement of particle size distribution of polymer latexes", 2010, Editors: L. Gugliottta, J. Vega, p. 129-153.

* cited by examiner

THERMOPLASTIC COMPOSITIONS WITH IMPROVED UV RESISTANCE

The present invention relates to improving UV resistance of vinylaromatic molding masses by means of compounding a thermoplastic polymer composition which comprises at least one graft copolymer with an organopolysiloxane compound and optionally further components.

Impact modified molding masses, such as acrylonitrile styrene acrylate (ASA), and blends thereof with other thermoplastic polymers are widely used in many applications such as, e.g., in automotive industry, electronic industry or for household goods. The popularity of these thermoplastic polymer compositions may be attributed to their balanced properties of good impact strength and melt flow characteristics.

Good surface characteristics, such as, e.g. good scratch resistance, are often of interest in the context of impact modified molding masses. Accordingly, ingredients for improving scratch resistance are sometimes added to molding masses. Inter alia, silicon-containing compounds, such as siloxanes have been described as improving scratch resistance under certain circumstances. EP-A 3219755 refers to an impact modified thermoplastic molding mass with high scratch resistance comprising a silicone-acrylate based copolymer. Herein, a siloxane-polyester copolymer is used for improving scratch resistance. WO 2015/132190 teaches siloxanes for improving scratch resistance and focusses on polypropylene molding masses.

EP-B 1983018 refers to a cross-linkable polysiloxane composition for coating that preferably contains colloidal silica. Similarly, EP-A 2436736 refers to compositions comprising organopolysiloxane in combination with colloidal silica used as a laminate film. The blending of an organopolysiloxane with a vinylaromatic molding mass such as ASA is not taught. EP-A 0369203 relates to graft copolymers comprising siloxanes and styrene in a graft shell grafted on a rubber core. Similarly, EP-A 0369204 relates to polysiloxane/polyvinyl-based graft copolymers. EP-A 0653447 teaches a graft polymer comprising polysiloxane in the graft base. The preparation of such graft copolymers, however, alters the chemical and mechanical properties of the graft copolymers and is rather complex.

EP-A 1529810 relates to polyester compositions comprising polysiloxane/polycarbonate copolymers, but does neither teaches nor suggests stabilizing thermoplastic polymer compositions based on a graft polymer and a vinylaromatic copolymer such as ASA. EP-A 1153950 teaches a crosslinking silyl-terminated stellar-structure vinyl polymer.

For a number of practical uses, good weathering stability, in particular UV resistance, is of interest for impact modified molding masses. ASA often has better weathering stability and UV resistance than many other impact modified compositions such as, e.g., acrylonitrile butadiene styrene (ABS). However, UV resistance is not sufficient for several uses. In particular when exposing an article to UV light and weathering influences, often, undesired greying is and color shift is observed. The use of UV stabilizers such as hindered amine light stabilizer (HALS) compounds or UV absorbers is still needed for many uses. Several documents such as U.S. Pat. Nos. 4,692,486, 9,701,813, EP-B 2593510 and DE-A 10316198 teach HALS stabilizers and combinations thereof as UV absorbers and light stabilizers. Even with addition of such stabilizers, effects such as color shift and greying is still observable to an unwanted high degree.

There is still an unmet need for further stabilizer compounds for improving UV resistance of a vinylaromatic molding mass. It is further desirable that such compounds can be easily used without altering the chemical structure of the thermoplastic polymer matrix.

It has been, surprisingly, found that organopolysiloxane compounds are effective stabilizers for improving UV resistance of vinylaromatic molding masses. In particular, molding masses comprising ASA can be further stabilized with respect to UV resistance. This beneficial effect can be easily obtained by adding organopolysiloxane compounds for this purpose. This surprising further effect of organopolysiloxane has neither been taught nor suggested by the above-referenced prior art.

Accordingly, a first aspect of the present invention relates to a method for improving UV resistance of a molding mass (P), wherein said method comprises (or consists of) the step of compounding the following components with another:
(A) 80 to 99.5 wt.-% of at least one thermoplastic polymer composition (A) comprising (or consisting of):
  (A-1) at least one graft copolymer (A-1), and
  (A-2) at least one thermoplastic matrix (A-2) based on one or more vinylaromatic copolymers;
(B) 0.5 to 5 wt.-% of at least one organopolysiloxane compound (B);
(C) 0 to 10 wt.-% of one or more colorants, dyes or pigments (C); and
(D) 0 to 5 wt.-% one or more further additives (D),
wherein the constituents (A) to (D) sum up to 100 wt.-% of the molding mass (P).

It will be understood that an organopolysiloxane compound (B) is a compound, i.e., a chemical entity. An organopolysiloxane compound (B) is typically not forming part of the graft copolymer (A-1), neither the core nor the graft shell of the graft copolymer (A-1).

Thermoplastic Polymer Composition (A) (Component A)

As indicated above, the molding mass (P), comprises at least one thermoplastic polymer composition (A). The thermoplastic polymer composition (A) comprises at least one graft copolymer (A-1).

Graft Copolymer (Component A-1)

In a preferred embodiment, a graft copolymer (A-1) is a rubber-modified copolymer of acrylonitrile and styrene. In a preferred embodiment, copolymers of acrylonitrile and styrene which are graft-polymerized on rubber particles derived from polymerizing at least one conjugated diene monomer or at least one acrylate monomer are used.

In a preferred embodiment, the at least one graft copolymer (A-1) used is composed of:
A-1.1: from 20 to 90 wt.-%, preferably from 40 to 90 wt.-%, particularly preferably from 45 to 85 wt.-%, very particularly preferably from 50 to 80 wt.-%, based on the total weight of the graft copolymer (A-1), of a graft base of one or more monomers consisting of:
  A-1.11: 65 to 100 wt.-% or 65 to 99.99 wt.-%, preferably 75 to 99.99 wt.-%, particularly preferably 80 to 99.98 wt.-%, based on the total weight of the graft base (A-1.1), of at least one C1 to C8 alkyl(meth)acrylate, in particular n-butyl acrylate and/or 2-ethylhexyl acrylate,
  A-1.12: 0 to 35 wt.-%, preferably 0 to 25 wt.-%, particularly preferably 0 to 20 wt.-%, based on the total weight of the graft base (A-1.1), of at least one further comonomer selected from: styrene, α-methyl styrene, acrylonitrile, methacrylonitrile, methyl methacrylate, maleic acid anhydride and N-phenyl-maleimide, preferably styrene and α-methyl styrene, particularly preferably styrene;

A-1.13: from 0 to 10 wt.-% or 0.01 to 10 wt.-%, preferably from 0.01 to 5, particularly preferably from 0.02 to 2 wt.-%, based on the total weight of the graft base (A-1.1), of one or more polyfunctional crosslinking monomers, selected from chosen from allyl(meth)acrylate, divinylbenzene, diallylmaleate, diallylfumarate, diallylphthalate, triallylcyanurat, triallylisocyanurat and dihydrodicyclopentadienyl acrylate (DCPA), which, when component A11 is acrylate, is present in amounts of at least 0.1 wt.-%;

A-1.2: from 10 to 80 wt.-%, preferably from 10 to 60 wt.-%, more preferably from 15 to 55 wt.-%, very particularly preferably from 20 to 50 wt.-%, based on the total weight of the graft copolymer (A-1), of at least one graft layer of one or more monomers consisting of:

A-1.21: from 65 to 95 wt.-%, preferably from 70 to 90 wt.-%, particularly preferably from 75 to 85 wt.-%, based on the total weight of the graft layer (A-1.2), of at least one vinylaromatic monomer, preferably styrene and/or α-methyl styrene, in particular styrene;

A-1.22: 5 to 35 wt.-%, preferably 10 to 30 wt.-%, particularly preferably 15 to 25 wt.-%, based on the total weight of the graft layer (A-1.2), of acrylonitrile and/or methacrylonitrile, preferably acrylonitrile; and A-1.3: 0 to 30 wt.-%, preferably 0 to 20 wt.-%, particularly preferably 0 to 15 wt.-%, based on the total weight of the graft copolymer (A-1), of at least one further constituent selected from:

at least one monoethylenically unsaturated monomer selected from: methyl methacrylate, maleic acid anhydride and N-phenylmaleimide, preferably methyl methacrylate and/or at least one molecular weight regulator, in particular a thiol-based molecular weight regulator such as tert-dodecylmercaptan.

Preferred polyfunctional crosslinking monomers are allyl (meth)acrylate and/or dihydrodicyclopentadienyl acrylate (DCPA), and more preferred DCPA.

Preferably, the graft copolymer (A-1) is prepared in an emulsions polymerization process or a suspension polymerization process. The graft base A-1.1, comprising (or consisting of) monomers A-1.11, A-1.12 and optionally A-1.13, as well as its preparation is known and described in the literature, e.g. DE-A 28 26 925, DE-A 31 49 358 and DE-A 34 14 118.

The graft polymerization used to synthesize graft shell A-1.2 may be conveniently done in the same vessel like the emulsion polymerization done for the synthesis of the graft base A-1.1. During the reaction additives, like emulsifiers, pH buffers and initiators can be added. The monomers of the graft shell, especially monomers A-1.21 and A-1.22 can be added at once to the reaction mixture or step-wise in several steps, preferably in a continuous way, added during polymerization. When monomers A-1.21 and/or A-1.22 are added in several steps typically a multi layered graft shell A-1.2 is obtained.

Suitable emulsifiers, buffers and initiators are described in WO 2015/150223 and WO 2015/078751.

In a preferred embodiment, the styrene-based graft copolymer (A-1) is acrylonitrile styrene acrylate (ASA) and mixtures thereof.

In a preferred embodiment, the graft copolymer (A-1) according to the invention is particularly preferably an ASA copolymer with A-1.1: from 40 to 90 wt.-%, based on the total weight of the styrene-based graft copolymer (A-1), of a graft base consisting of:

A-1.11: from 65 to 99.9 wt.-%, preferably from 90 to 99.5 wt.-%, based on the total weight of the graft base (A-1.1), of at least one C1 to C8 alkyl(meth)acrylate, preferably n-butyl acrylate and/or 2-ethylhexylacrylate, in particular n-butyl acrylate, A-1.12: 0 to 35 wt.-%, preferably 1 to 10 wt.-%, based on the total weight of the graft base (A-1.1), of styrene, A-1.13: 0.1 to 5 wt.-%, preferably 0.5 to 5 wt.-%, in particular 0.5 to 3 wt.-%, most preferred 1 to 2.5 wt.-%, based on the total weight of the graft base (A-1.1), of at least one polyfunctional cross-linking monomer, selected from chosen from allyl(meth) acrylate, divinylbenzene, diallylmaleate, diallylfumarate, diallylphthalate, triallylcyanurat, triallylisocyanurat and dihydrodicyclopentadienyl acrylate (DCPA), preferably selected from allyl(meth)acrylate and DCPA, in particular DCPA, and A-1.2: from 10 to 60 wt.-%, based on the total weight of the styrene-based graft copolymer (A-1), of a graft comprising (or consisting of):

A-1.21: from 65 to 95 wt.-%, based on the total weight of the graft layer (A-1.2), of styrene;

A-1.22: 5 to 35 wt.-%, based on the total weight of the graft layer (A-1.2), of acrylonitrile and A-1.3: 0 to 30 wt.-%, based on the total weight of the styrene-based graft copolymer (A-1), MMA.

In a preferred embodiment, the at least one graft copolymer (A-1) is or comprises an acrylonitrile styrene acrylate (ASA) having an average particle size $d_{50}$ of the rubber particles in the ASA copolymer from 50 to 1000 nm, preferably from 60 to 600 nm, wherein the average particle size is determined by scattered light measurement.

Typically the mean particle diameter can be measured by scattered light measurement, i.e., determined by turbidity (Lange, Kolloid-Zeitschrift und Zeitschrift für Polymere, 1968, 223(1):24-30), or by ultracentrifugation (e.g. described in Scholtan and Lange, Kolloid-Zeitschrift und Zeitschrift für Polymere, 1972, 250(8):782-796), or using Hydrodynamic Chromatography HDC (e.g. described in W. Wohlleben, H. Schuch, "Measurement of Particle Size Distribution of Polymer Latexes", 2010, Editors: L. Gugliotta, J. Vega, p. 129-153).

In a preferred embodiment, the graft copolymer (A-1) comprises a binary or trinary size distribution comprising (or consisting of)

(A-1a) at least one graft copolymer (A-1a) having an average particle size $d_{50}$ of the rubber particles in the ASA copolymer from 50 to 150 nm; and (A-1 b) at least one graft copolymer (A-1 b) having an average particle size $d_{50}$ of the rubber particles in the ASA copolymer from 200 to 750 nm.

In a preferred embodiment, the graft copolymer (A-1) comprises a binary or trinary size distribution comprising (or consisting of)

(A-1a) at least one graft copolymer (A-1a) having an average particle size $d_{50}$ of the rubber particles in the ASA copolymer from 50 to 150 nm or 70 to 100 nm; and (A-1b) at least one graft copolymer (A-1b) having an average particle size $d_{50}$ of the rubber particles in the ASA copolymer from 200 to 750 nm or 400 to 600 nm.

In a preferred embodiment, a first basic rubber latex (L1) may be obtained from (co)polymerizing butyl acrylate and one or more crosslinking agents (e.g., tricyclodecenyl acrylate) in an aqueous solution that may comprise further ingredients such as, e.g., one or more salts (e.g., C12- to C18-paraffin sulfonic acid and/or sodium bicarbonate. The temperature of the reaction may be, for example, in the range of from 55 to 70° C. In a preferred embodiment, a mass ratio of butyl acrylate:tricyclodecenyl acrylate in the range of from 10:1 to 100:1, preferably of from 40:1 to 80:1, is used for polymerization. The mass ratios and definitions of the components are preferably as described herein. More specific examples are also provided in the experimental section below.

In a preferred embodiment, a first graft rubber latex (component A-1a) may be obtained from (co)polymerizing a basic rubber latex (e.g., a first basic rubber latex L1 obtainable as described before) with styrene and acrylonitrile in an aqueous solution that may comprise further ingredients such as, e.g., one or more salts (e.g., sodium persulfate). The reaction temperature may be in the range of from 50 to 80° C. Optionally, the obtained graft latex may be coagulated. Coagulation may be achieved in a salt solution (e.g., a magnesium sulfate solution) at a temperature in the range of from 50 to 80° C. Coagulation may optionally be followed by sintering (e.g., at a temperature in the range of from 80 to 150° C.). The mass ratios and definitions of the components are preferably as described herein. More specific examples are also provided in the experimental section below.

In a preferred embodiment, a second basic rubber latex (L2) may be obtained from (co)polymerizing butyl acrylate and one or more crosslinking agents (e.g., tricyclodecenyl acrylate) in the presence of a first basic rubber latex such as that described as L1 above in an aqueous solution that may comprise further ingredients such as, e.g., one or more salts (e.g., sodium bicarbonate, sodium persulfate and/or C12- to C18-paraffin sulfonic acid). The temperature of the reaction may be, for example, in the range of from 55 to 70° C. In a preferred embodiment, a mass ratio of butyl acrylate:tricyclodecenyl acrylate in the range of from 10:1 to 100:1, preferably of from 40:1 to 80:1, is used for polymerization. The mass ratios and definitions of the components are preferably as described herein. More specific examples are also provided in the experimental section below.

In a preferred embodiment, a second graft rubber latex (component A-1b) may be obtained from (co)polymerizing a basic rubber latex (e.g., a second basic rubber latex L2 obtainable as described before) with styrene and acrylonitrile in an aqueous solution that may comprise further ingredients such as, e.g., one or more salts (e.g., sodium persulfate). The reaction temperature may be in the range of from 50 to 80° C. Optionally, the obtained graft latex may be coagulated. Coagulation may be achieved in a salt solution (e.g., a magnesium sulfate solution) at a temperature in the range of from 70 to 99° C. Coagulation may optionally be followed by sintering (e.g., at a temperature in the range of from 80 to 150° C.). The mass ratios and definitions of the components are preferably as described herein. More specific examples are also provided in the experimental section below.

Thermoplastic Matrix (Component A-2)

In a preferred embodiment, the at least one thermoplastic matrix (A-2) comprises a copolymer which contains at least one vinyl cyanide and at least one vinylaromatic. In a preferred embodiment, throughout the present invention, the vinyl cyanide is acrylonitrile. In a preferred embodiment, throughout the present invention, the vinylaromatic is styrene, alpha-methylstyrene or a combination thereof.

In a preferred embodiment, the at least one thermoplastic matrix (A-2) comprises a copolymer which contains acrylonitrile and at least one vinylaromatic selected from styrene, alpha-methylstyrene and a combination thereof, in particular styrene. A copolymer that comprises or consists of acrylonitrile and styrene may also be designated as poly (styrene-acrylonitrile) (SAN). A copolymer that comprises or consists of acrylonitrile and alpha-methylstyrene may also be designated as poly(α-methyl styrene/acrylonitrile) (AMSAN).

Poly(styrene-acrylonitrile) (SAN) and/or poly(α-methyl styrene/acrylonitrile) (AMSAN) may be used as thermoplastic polymer (A). In general, any SAN and/or AMSAN copolymer known in in the art may be used within the subject-matter of the present invention.

In a preferred embodiment, the at least one thermoplastic polymer composition (A) comprises at least one copolymer (A-2) comprising (or consisting of):
18 to 45 wt.-% of at least one vinyl cyanide, in particular acrylonitrile; and
55 to 82 wt.-% of at least one vinylaromatic, in particular a vinylaromatic selected from styrene and alpha-methylstyrene.

In a preferred embodiment, the SAN and AMSAN copolymers of the present invention contain:
from 50 to 99 wt.-%, based on the total weight of the SAN and/or AMSAN copolymer, of at least one member selected from the group consisting of styrene and α-methyl styrene; and
from 1 to 50 wt.-%, based on the total weight of the SAN and/or AMSAN copolymer, of acrylonitrile.

The weight average molecular weight (as determined by gel permeation chromatography relative to polystyrene as standard) of the SAN or AMSAN copolymer may be in the range of 15,000 to 200,000 g/mol, preferably in the range of 30,000 to 150.000 g/mol.

In a preferred embodiment, the ratios by weight of the components making up the SAN or AMSAN copolymer are 60 to 95 wt.-%, based on the total weight of the SAN and/or AMSAN copolymer, of styrene and/or α-methyl styrene and 40 to 5 wt.-%, based on the total weight of the SAN and/or AMSAN copolymer, of acrylonitrile.

In a preferred embodiment, SAN or AMSAN containing proportions of incorporated acrylonitrile monomer units of <36 wt.-%, based on the total weight of the SAN and/or AMSAN copolymer may be used.

In a preferred embodiment, copolymers of styrene with acrylonitrile of the SAN or AMSAN type incorporating comparatively little acrylonitrile (not more than 35 wt.-%, based on the total weight of the SAN and/or AMSAN copolymer) are used.

Among the afore-mentioned most preferred SAN or AMSAN copolymers those having a viscosity number VN (determined according to DIN 53726 at 25° C., 0.5% by weight in dimethylformamide) of from 50 to 120 ml/g are in particular preferred.

As used herein, as far as not otherwise defined, all measurement norms such as, e.g., DIN norms and PV norms, preferably refer to the version that was up-to-date in March 2018.

The copolymers of SAN or AMSAN component are known and the methods for their preparation, for instance, by radical polymerization, more particularly by emulsion, suspension, solution and bulk polymerization are also well documented in the literature.

Thermoplastic Polymer Composition (A)

In a preferred embodiment, the at least one thermoplastic polymer composition (A) comprises (or consists of)

(A-1) 5 to 50 wt.-%, referred to the thermoplastic polymer composition (A), of at least one graft copolymer (A-1) comprising or consisting of an acrylonitrile styrene acrylate (ASA) having an average particle size $d_{50}$ of the rubber particles in the ASA copolymer from 50 to 1000 nm, wherein the average particle size is determined by scattered light measurement; and (A-2) 20 to 95 wt.-%, referred to the thermoplastic polymer composition (A), of at least one thermoplastic matrix (A-2) comprising 18 to 45 wt.-% of at least one vinyl cyanide, in particular acrylonitrile, and 55 to 82 wt.-% of at least one vinylaromatic, in particular an vinylaromatic selected from styrene and alpha-methylstyrene, and, (A-3) 0 to 75 wt.-%, referred to the thermoplastic polymer composition (A), of one or more additional thermoplastic polymers (A-3), in particular one or more additional thermoplastic polymers (A-3) selected from the group consisting of polycarbonate (PC), polyamide (PA), and mixtures thereof.

In another preferred embodiment, thermoplastic polymer composition (A) comprises 5 to 50 wt.-%, preferably 7 to 50 wt.-%, in particular 10 to 45 wt.-%, based on the total weight of thermoplastic polymer composition (A), of at least one styrene-based graft copolymer (A-1) and 0 to 95 wt.-%, preferably 20 to 93 wt.-%, in particular 45 to 90 wt. %, based on the total weight of thermoplastic polymer composition (A), of at least one thermoplastic matrix (A-2) selected from poly(styrene-acrylonitrile) (SAN), poly(α-methyl styrene-acrylonitrile) (AMSAN) and mixtures thereof.

In another preferred embodiment, thermoplastic polymer composition (A) comprises 20 to 50 wt.-%, preferably 30 to 40 wt.-%, based on the total weight of thermoplastic polymer composition (A), of at least one styrene-based graft copolymer (A-1) (graft copolymer) and 40 to 80 wt.-%, preferably 60 to 70 wt.-%, based on the total weight of thermoplastic polymer composition (A), of at least one thermoplastic matrix (A-2) selected from poly(styrene-acrylonitrile) (SAN), poly(α-methyl styrene-acrylonitrile) (AMSAN) and mixtures thereof.

In another preferred embodiment, thermoplastic polymer composition (A) comprises 5 to 50 wt.-%, preferably 20 to 40 wt.-%, based on the total weight of thermoplastic polymer composition (A), of at least one styrene-based graft copolymer (A-1) and 40 to 80 wt.-%, preferably 60 to 70 wt.-%, based on the total weight of thermoplastic polymer composition (A), of a thermoplastic matrix (A-2) comprising 40 to 60 wt.-% of SAN and 60 to 40 wt.-% AMSAN, preferably 45 to 55 wt.-% of SAN and 55 to 45 wt.-% AMSAN, based on the total weight of the thermoplastic matrix (A-2).

In another preferred embodiment, thermoplastic polymer composition (A) comprises from 5 to 50 wt.-%, based on the total weight of thermoplastic polymer composition (A), of at least one constituent A-1; from 5 to 80 wt.-% based on the total weight of thermoplastic polymer composition (A), of at least one constituent A-2, selected from poly(styrene-acrylonitrile) (SAN), poly(α-methyl styrene-acrylonitrile) (AMSAN), and mixtures thereof; and from 0 to 75 wt.-%, in particular from 40 to 55 wt.-%, based on the total weight of a further polymer component (A-3), selected from polycarbonate (PC), polyamide (PA) and mixtures thereof. In particular, component (A-3) is one or more polycarbonates (PC).

In a preferred embodiment, thermoplastic polymer composition (A) comprises 0 to 75 wt.-%, from 10 to 70 wt.-%, from 20 to 65 wt.-%, from 30 to 60 wt.-%, or from 40 to 55 wt.-%, based on the total weight of a further polymer component (A-3).

In a preferred embodiment, thermoplastic polymer composition (A) comprises 0 to 75 wt.-%, from 10 to 70 wt.-%, from 20 to 65 wt.-%, from 30 to 60 wt.-%, or from 40 to 55 wt.-%, based on the total weight of a further polymer component (A-3), wherein A-3 is selected from polycarbonate (PC), polyamide (PA) and mixtures thereof, in particular wherein A-3 is one or more polycarbonates (PC).

In another preferred embodiment, thermoplastic polymer composition (A) comprises (or consists of)

(A-1) 5 to 50 wt.-% (or 20 to 40 wt.-%), referred to the thermoplastic polymer composition (A), of at least one graft copolymer (A-1); and (A-2) 20 to 65 wt.-% (or 25 to 40 wt.-%), referred to the thermoplastic polymer composition (A), of at least one thermoplastic matrix (A-2) comprising at least one vinyl cyanide and at least one vinylaromatic, and, (A-3) 30 to 75 wt.-% (or 40 to 55 wt.-%), referred to the thermoplastic polymer composition (A), of one or more additional thermoplastic polymers (A-3), in particular one or more polycarbonate polymers.

In another preferred embodiment, thermoplastic polymer composition (A) comprises (or consists of)

(A-1) 5 to 50 wt.-% (or 20 to 40 wt.-%), referred to the thermoplastic polymer composition (A), of at least one graft copolymer (A-1) comprising or consisting of an acrylonitrile styrene acrylate (ASA) having an average particle size $d_{50}$ of the rubber particles in the ASA copolymer from 50 to 1000 nm, wherein the average particle size is determined by scattered light measurement; and (A-2) 20 to 65 wt.-% (or 25 to 40 wt.-%), referred to the thermoplastic polymer composition (A), of at least one thermoplastic matrix (A-2) comprising 18 to 45 wt.-% of at least one vinyl cyanide and 55 to 82 wt.-% of at least one vinylaromatic, and, (A-3) 30 to 75 wt.-% (or 40 to 55 wt.-%), referred to the thermoplastic polymer composition (A), of one or more additional thermoplastic polymers (A-3), in particular one or more polycarbonate polymers.

Polycarbonate Component

A polycarbonate may be any polycarbonate. Polycarbonate includes one or more, preferably one or two, more preferably one aromatic polycarbonate. Aromatic polycarbonate includes for example polycondensation products, for example aromatic polycarbonates, aromatic polyester carbonates.

Aromatic polycarbonates and/or aromatic polyester carbonates which are suitable according to the invention are known from the literature or may be prepared by processes known from the literature (for the preparation of aromatic polycarbonates see, for example, DE-B 1 495 626, DE-A 2 232 877, DE-A 2 703 376, DE-A 2 714 544, DE-A 3 000 610 and DE-A 3 832 396). The preparation of aromatic polycarbonates may be carried out, e.g., by reaction of diphenols with carbonic acid halides, preferably phosgene, and/or with aromatic dicarboxylic acid dihalides, preferably benzenedicarboxylic acid dihalides, by the phase interface process, optionally using chain terminators, for example monophenols, and optionally using branching agents which are trifunctional or more than trifunctional, for example triphenols or tetraphenols.

A preparation via a melt polymerization process by reaction of diphenols with, for example, diphenyl carbonate is also possible.

Diphenols for the preparation of the aromatic polycarbonates and/or aromatic polyester carbonates are preferably those of the formula (Ia)

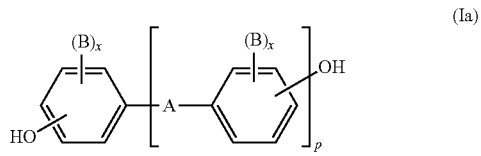

(Ia)

wherein A is a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, on to which further aromatic rings optionally containing heteroatoms may be fused, or a radical of the formula (IIa) or (IIIa),

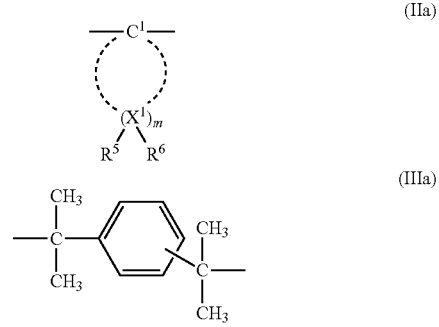

B in each case is $C_1$ to $C_{12}$-alkyl, preferably methyl, or halogen, preferably chlorine and/or bromine, x in each case independently of one another, is 0, 1 or 2, p is 1 or 0 and $R^5$ and $R^6$ individually for each $X^1$ and independently of one another denote hydrogen or $C_1$ to $C_6$-alkyl, preferably hydrogen, methyl or ethyl, $X^1$ denotes carbon and m denotes an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis(hydroxyphenyl)-$C_1$-$C_5$-alkanes, bis-(hydroxyphenyl)-$C_5$-$C_6$-cycloalkanes, bis(hydroxyphenyl) ethers, bis-(hydroxyphenyl)sulfoxides, bis-(hydroxyphenyl) ketones, bis(hydroxyphenyl)sulfones and α,α-bis-(hydroxyphenyl)-diisopropyl-benzenes and nucleus-brominated and/or nucleus-chlorinated derivatives thereof. Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or chlorinated derivatives thereof, such as, for example, 2,2-bis-(3-chloro-4-hydroxyphenyl)-propane, 2,2-bis-(3,5-dichloro-4-hydroxyphenyl)propane or 2,2-bis-(3,5-dibromo-4-hydroxyphenyl)-propane. 2,2-bis-(4-hydroxyphenyl)propane (bisphenol A) is particularly preferred. The diphenols may be employed individually or as any desired mixtures. The diphenols are known from the literature or obtainable by processes known from the literature.

Chain terminators which are suitable for the preparation of the thermoplastic, aromatic polycarbonates may be, for example, phenol, p-chlorophenol, p-tert-butylphenol or 2,4,6-tribromophenol, and also long-chain alkylphenols, such as 4-[2-(2,4,4-trimethylpentyl)]-phenol, 4-(1,3-tetramethylbutyl)-phenol according to DE-A 2 842 005 or monoalkylphenols or dialkylphenols having a total of 8 to 20 carbon atoms in the alkyl substituents, such as 3,5-di-tert-butylphenol, p-iso-octylphenol, p-tert-octylphenol, p-dodecylphenol and 2-(3,5-dimethylheptyl)-phenol and 4-(3,5-dimethylheptyl)-phenol.

The amount of chain terminators to be employed may be in general between 0.5 mol % and 10 mol %, based on the sum of the moles of the particular diphenols employed.

In a preferred embodiment, polycarbonates in the sense of the present invention are thermoplastic, aromatic polycarbonates having an average weight-average molecular weights ($M_W$, measured e.g. by means of an ultracentrifuge or by scattered light measurement) of from 10,000 to 200,000 g/mol, preferably 15,000 to 80,000 g/mol, particularly preferably 24,000 to 32,000 g/mol.

The thermoplastic, aromatic polycarbonates may be branched in a known manner, and in particular preferably by incorporation of from 0.05 to 2.0 mol %, based on the sum of the diphenols employed, of compounds which are trifunctional or more than trifunctional, for example those having three and more phenolic groups. Both homopolycarbonates and copolycarbonates are suitable.

The aromatic polyester carbonates may be either linear or branched in a known manner (in this context see DE-A 2 940 024 and DE-A 3 007 934). Branching agents which may be used are, for example, carboxylic acid chlorides which are trifunctional or more than trifunctional, such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol % (based on the dicarboxylic acid dichlorides employed), or phenols which are trifunctional or more than trifunctional, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri(4-hydroxyphenyl)-benzene, 1,1,1-tri-(4-hydroxyphenyl)-ethane, tri-(4-hydroxyphenyl)phenylmethane, 2,2-bis-[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5-methyl-benzyl)-4-methyl-phenol, 2-(4-hydroxyphenyl)-2-(2,4-di hydroxyphenyl)propane, tetra-(4-[4-hydroxyphenyl-isopropyl]-phenoxy)-methane and 1,4-bis-[4,4'-dihydroxytriphenyl)-methyl]-benzene, in amounts of from 0.01 to 1.0 mol %, based on the diphenols employed. Phenolic branching agents may be initially introduced into the reaction vessel with the diphenols, and acid chloride branching agents may be introduced together with the acid dichlorides.

The content of carbonate structural units in the thermoplastic, aromatic polyester carbonates may be varied as desired. Preferably, the content of carbonate groups is up to 100 mol %, in particular up to 80 mol %, particularly preferably up to 50 mol %, based on the sum of ester groups and carbonate groups. Both the ester and the carbonate content of the aromatic polyester carbonates may be present in the polycondensate in the form of blocks or in random distribution.

The relative solution viscosity ($\eta_{rel}$) of the aromatic polycarbonates and polyester carbonates is in the range of 1.18 to 1.4, preferably 1.20 to 1.32 (measured on solutions of 0.5 g polycarbonate or polyester carbonate in 100 ml methylene chloride solution at 25° C.).

The thermoplastic, aromatic polycarbonates and polyester carbonates may be employed by themselves or in any desired mixture of one or more, preferably one to three or one or two thereof. Most preferably only one type of polycarbonate is used. Preferably the aromatic polycarbonate is a polycarbonate based on bisphenol A and phosgene, which includes polycarbonates that have been prepared from corresponding precursors or synthetic building blocks of bisphenol A and phosgene. These preferred aromatic polycarbonates may be linear or branched due to the presence of branching sites.

Polyamide Component

A polyamide may be any polyamide. Examples for suitable polyamides are known homopolyamides, co-polyamides and mixtures of such polyamides. They may be semi-crystalline and/or amorphous polyamides. Suitable semi-crystalline polyamides are polyamide-6, polyamide-6,6, mixtures and corresponding copolymers of those components. Also included are semi-crystalline polyamides the acid component of which consists wholly or partially of terephthalic acid and/or isophthalic acid and/or suberic acid and/or sebacic acid and/or azelaic acid and/or adipic acid and/or cyclohexanedicarboxylic acid, the diamine component of which consists wholly or partially of m- and/or pxylylene-diamine and/or hexamethylenediamine and/or 2,2,4-trimethylhexamethylenediamine and/or 2,2,4-trimethylhexamethylenediamine and/or isophoronediamine, and the composition of which is in principle known. Mention may also be made of polyamides that are prepared wholly or partially from lactams having from 7 to 12 carbon atoms in the ring, optionally with the concomitant use of one or more of the above-mentioned starting components.

Particularly preferred semi-crystalline polyamides are polyamide-6 and polyamide-6,6 and mixtures thereof. Known products may be used as amorphous polyamides. They are obtained by polycondensation of diamines, such as ethylenediamine, hexamethylenediamine, decamethylenediamine, 2,2,4- and/or 2,4,4-trimethylhexamethylenediamine, m- and/or p-xylylene-diamine, bis-(4-aminocyclohexyl)-methane, bis-(4-aminocyclohexyl)-propane, 3,3'-dimethyl-4,4'-diamino-dicyclohexylmethane, 3-aminomethyl-3,5,5-trimethylcyclohexylamine, 2,5- and/or 2,6-bis-(aminomethyl)norbornane and/or 1,4-diaminomethylcyclohexane, with dicarboxylic acids such as oxalic acid, adipic acid, azelaic acid, azelaic acid, decanedicarboxylic acid, heptadecanedicarboxylic acid, 2,2,4- and/or 2,4,4-trimethyladipic acid, isophthalic acid and terephthalic acid.

Also suitable are copolymers obtained by polycondensation of a plurality of monomers, as well as copolymers prepared with the addition of aminocarboxylic acids such as ε-aminocaproic acid, ω-aminoundecanoic acid or ω-aminolauric acid or their lactams. Particularly suitable amorphous polyamides are the polyamides prepared from isophthalic acid, hexamethylenediamine and further diamines such as 4,4'-diaminodicyclohexylmethane, isophoronediamine, 2,2,4- and/or 2,4,4-trimethylhexamethylenediamine, 2,5- and/or 2,6-bis-(aminomethyl)-norbornene; or from isophthalic acid, 4,4'-diamino-dicyclohexylmethane and ε-caprolactam; or from isophthalic acid, 3,3'-dimethyl-4,4'-diamino-dicyclohexylmethane and laurinlactam; or from terephthalic acid and the isomeric mixture of 2,2,4- and/or 2,4,4-trimethyl-hexamethylenediamine. Instead of pure 4,4'-diaminodicyclohexylmethane it is also possible to use mixtures of the position-isomeric diaminodicyclohexylmethanes, which are composed of from 70 to 99 mol % of the 4,4'-diamino isomer, from 1 to 30 mol % of the 2,4'-diamino isomer, from 0 to 2 mol % of the 2,2'-diamino isomer and optionally corresponding to more highly condensed diamines, which are obtained by hydrogenation of industrial grade diaminodiphenylmethane. Up to 30% of the isophthalic acid may be replaced by terephthalic acid.

The polyamides preferably have a relative viscosity (measured on a 1 wt. % solution in m-cresol or 1% (weight/volume) solution in 96 wt. % sulfuric acid at 25° C.) of from 2.0 to 5.0, particularly preferably from 2.5 to 4.0.

In a preferred embodiment, the at least one thermoplastic polymer composition (A) comprises (or consists of):

(A-1) 5 to 50 wt.-% (or 20 to 40 wt.-%), referred to the thermoplastic polymer composition (A), of at least one graft copolymer (A-1) comprising or consisting of an acrylonitrile styrene acrylate (ASA) having an average particle size $d_{50}$ of the rubber particles in the ASA copolymer from 50 to 1000 nm, wherein the average particle size is determined by scattered light measurement; and (A-2) 20 to 95 wt.-% (or 25 to 40 wt.-%), referred to the thermoplastic polymer composition (A), of at least one thermoplastic matrix (A-2) comprising 18 to 45 wt.-% of at least one vinyl cyanide, in particular acrylonitrile, and 55 to 82 wt.-% of at least one vinylaromatic, in particular an vinylaromatic selected from styrene and alpha-methylstyrene, and, (A-3) 0 to 75 wt.-%, 30 to 75% (or 40 to 55 wt.-%), referred to the thermoplastic polymer composition (A), of one or more additional thermoplastic polymers (A-3), in particular one or more additional thermoplastic polymers (A-3) selected from the group consisting of polycarbonate (PC), polyamide (PA), and mixtures thereof.

Organopolysiloxane Compound (Component B)

The organopolysiloxane compound (B) may be any organopolysiloxane. It was surprisingly found that the addition of small amounts of at least one organopolysiloxane compound (B) was sufficient for improving UV resistance of a molding mass (P) of the present invention.

In a preferred embodiment, the at least one organopolysiloxane compound (B) has a weight average molecular weight Mw of 20,000 g/mol to 100,000 g/mol, preferably 30,000 g/mol to 80,000 g/mol, determined by gel permeation chromatography (GPC) relative to polystyrene as standard and tetrahydrofuran (THF) as solvent.

In a preferred embodiment, the viscosity at 25° C. of the organopolysiloxane compound (B) is from 500 to 5000 mPas, determined for example by a falling ball viscometer or a capillary viscometer. In a preferred embodiment, the at least one organopolysiloxane compound (B) comprises repeating units having the following formula (I):

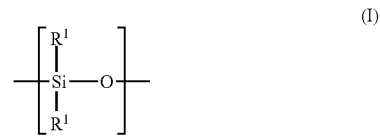

wherein each $R^1$ is independently selected from a linear or branched, saturated or unsaturated hydrocarbon group having 1 to 10, preferably 1 to 6, carbon atoms.

In a preferred embodiment, each $R^1$ is independently selected from a linear or branched or cyclic, saturated or unsaturated hydrocarbon group having 1 to 6, carbon atoms.

As used herein, a hydrocarbon group may be understood in the broadest sense. For example, a hydrocarbon group may be an aliphatic, an aromatic, an alkylaromatic, an alkenylaromatic, an alkinylaromatic, an alkylated aryl, an alkenylated aryl, an alkylated (and/or alkenylated and/or alkinylated) alkylaromatic group, etc. For example, a hydrocarbon group may be selected from the group consisting of a linear, branched or cyclic alkyl group, a linear, branched or cyclic alkynyl group, and a linear, branched or cyclic alkenyl group. For example, a hydrocarbon group may be selected from the group consisting of a methyl group, an ethyl group, an n-propyl group, an i-propyl group, a linear, branched or cyclic butyl group, a linear, branched or cyclic pentyl group, or a linear, branched or cyclic or cyclic hexyl group. For example, a hydrocarbon group may be selected from the group consisting of an aryl group, in particular a phenyl group, which may be optionally alkylated, and an alkylaryl group, in particular an alkyl phenyl group, which may be optionally alkylated.

In a preferred embodiment, the organosiloxane moieties of the organopolysiloxane compound (B) are selected from the group consisting of poly(dimethylsiloxane), poly(diethylsiloxane), poly(dipropylsiloxane), poly(dibutylsiloxane), and mixtures thereof.

In a preferred embodiment, the organopolysiloxane compound (B) is not poly[methylpropyl-3-oxy-4-(2,2,6,6-tetramethyl-4-piperidyl)]siloxane. In a preferred embodiment, the organopolysiloxane compound (B) is not forming part of a graft copolymer.

In an alternative preferred embodiment, the at least one organopolysiloxane compound (B) comprises polysiloxane moieties derived from repeating units having the above-defined formula (I) and from repeating units having the following formula (Ib):

wherein $R^1$ is defined as above and $R^4$ represents a polyolefin moiety, preferably derived from repeating units selected from ethylene, propylene and mixtures thereof. The repeating units of formula (Ib) are statistically distributed within the polysiloxane moieties and amount to 1 to 50 wt.-%, preferably 2 to 30 wt.-%, in particular 3 to 15 wt.-%, based on the entire weight of the polysiloxane moieties. Thus, the alternative embodiment relates to a block copolymer having a brush structure.

In a preferred embodiment, the at least one organopolysiloxane compound (B) is a block copolymer comprising blocks of polysiloxane moieties comprising repeating units of formula (I) and blocks of polyester and/or polyolefin moieties.

The organopolysiloxane compound (B) may further comprise at least one further repeating unit, in particular repeating units derived from polymerizable esters and/or olefins. In a further preferred embodiment, the organopolysiloxane compound (B) is a block copolymer comprising at least one block of polysiloxane moieties comprising repeating units of formula (I) and at least one block of polyester moieties and/or at least one block of polyolefin moieties. Furthermore, functional groups may be present, preferably as terminal groups. Particular preferred functional groups are selected from vinyl groups and/or alkoxy groups, in particular alkoxy groups having linear or branched alkyl groups comprising 1 to 6 carbon atoms.

In a preferred embodiment, the organopolysiloxane compound (B) comprises more than 70 wt.-%, preferably more than 80 wt.-% and in particular more than 90 wt.-% of repeating units having the following formula (I), in particular with each $R^1$ representing —$CH_3$, or —$CH_2CH_3$.

In another preferred embodiment, the polyester moiety of the organopolysiloxane compound (B) is—if present—derived from repeating units having the following formula (II):

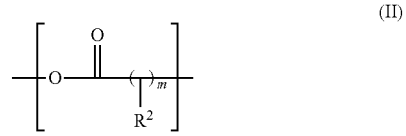

wherein $R^2$ is independently selected from a hydrogen atom and a linear or branched, saturated or unsaturated hydrocarbon group having 1 to 10, preferably 1 to 6, carbon atoms, and m is an integer from 1 to 10, preferably 1 to 5. In a further preferred embodiment, $R^2$ represents a hydrogen atom.

In another preferred embodiment, the polyolefin moiety of the organopolysiloxane compound (B) is—if present—derived from repeating units selected from ethylene, propylene and mixtures thereof.

In one embodiment of the invention, the at least one organopolysiloxane compound is a polyester-polysiloxane-block copolymer. The polysiloxane block is preferably derived from repeating units having the above formula (I).

In another preferred embodiment of the invention, the at least one organopolysiloxane compound is a polyolefin-polysiloxane-block copolymer. The polysiloxane block is preferably derived from repeating units having the above formula (I).

In a further preferred embodiment, the at least one organopolysiloxane compound (B) is a [polyolefin-b-polysiloxane-b-polyester] triblock copolymer. The polysiloxane block is preferably derived from repeating units having the above formula (I).

As previously described, the at least one organopolysiloxane compound (B) may be present in amounts of 0.5 to 5 wt.-% based on the entire molding mass (P). However, it was found that even very small amounts, in particular, amounts in the range of 0.55 to 4 wt.-% or 0.6 to 3 wt.-% of the at least one organopolysiloxane compound are already sufficient to achieve the advantageous technical effects.

Colorants, Dyes and Pigments (Optional Component C)

As indicated above, the molding mass (P) may further comprise 0 to 10 wt.-%, often 0.1 to 5 wt.-% of dyes, pigments, or colorants which may be added in form of master batches comprising the dyes, pigments, or colorants in a polymer matrix. In a preferred embodiment, the dyes, pigments, or colorants are added in form of a master batch comprising 20 to 70 wt.-%, preferably 40 to 60 wt.-%, based on the total amount of the master batch, of dyes, pigments, colorants or mixtures thereof and 30 to 80 wt.-%, preferably 40 to 60 wt.-%, based on the total amount of the master batch, a copolymer of an vinylaromatic olefin and acrylonitrile as matrix polymer. Preferably, the matrix polymer is selected from poly(styrene-acrylonitrile) (SAN), poly(α-methyl styrene/acrylonitrile) (AMSAN), and/or poly(styrene-methyl methacrylate) (SMMA).

Examples of suitable pigments include titanium dioxide, phthalocyanines, ultramarine blue, iron oxides and carbon black, and also the entire class of organic pigments. Examples of suitable colorants include all dyes that may be used for the transparent, semi-transparent, or non-transparent coloring of polymers, in particular those suitable for coloring styrene copolymers.

In a preferred embodiment, the molding mass (P) comprises carbon black as component (C).

Further Additives (Optional Component D)

As used herein, the one or more further additives (D) may be any additives usable in molding mass (P). For example a further additive (D) may be selected from the group consisting of plasticizers, aliphatic amide waxes, aliphatic fatty acid esters, and UV stabilizers.

Optionally, various additives may be added to the molding compounds in amounts of from 0 to 5 wt.-%, often 0.1 to 5 wt.-%, as assistants and processing additives. Suitable added additives (D) include all substances customarily employed for processing or finishing the polymers. In general, the presence of organopolysiloxane compounds (B) does not exclude the presence of additives (D) comprising organopolysiloxane compounds which are different from the organopolysiloxane compounds (B).

Additives (D) may be added in form of master batches comprising additives (D) in a polymer matrix. In a preferred embodiment, the additives (D) are added in form of a master batch comprising 20 to 70 wt.-%, preferably 40 to 60 wt.-%, based on the total amount of the master batch, of additives (D) or mixtures thereof and 30 to 80 wt.-%, preferably 40 to 60 wt.-%, based on the total amount of the master batch, a copolymer of an vinylaromatic olefin and acrylonitrile as matrix polymer. Preferably, the matrix polymer is selected from poly(styrene-acrylonitrile) (SAN), poly(α-methyl styrene/acrylonitrile) (AMSAN), and/or poly(styrene-methyl methacrylate) (SMMA).

Examples of additives (D) include, for example, antistatic agents, antioxidants, flame retardants, stabilizers for improving thermal stability, stabilizers for increasing photostability, stabilizers for enhancing hydrolysis resistance and chemical resistance, anti-thermal decomposition agents and in particular lubricants that are useful for production of molded bodies/articles. These further added substances may be admixed at any stage of the manufacturing operation, but preferably at an early stage in order to profit early on from the stabilizing effects (or other specific effects) of the added substance.

Examples of suitable antistatic agents include amine derivatives such as N,N-bis(hydroxyalkyl)alkylamines or -alkyleneamines, polyethylene glycol esters, copolymers of ethylene oxide glycol and propylene oxide glycol (in particular two-block or three-block copolymers of ethylene oxide blocks and propylene oxide blocks), and glycerol mono- and distearates, and mixtures thereof.

Examples of suitable antioxidants include sterically hindered monocyclic or polycyclic phenolic antioxidants which may comprise various substitutions and may also be bridged by substituents. These include not only monomeric but also oligomeric compounds, which may be constructed of a plurality of phenolic units. Hydroquinones and hydroquinone analogs are also suitable, as are substituted compounds, and also antioxidants based on tocopherols and derivatives thereof. It is also possible to use mixtures of different antioxidants. It is possible in principle to use any compounds which are customary in the trade or suitable for styrene copolymers, for example antioxidants from the Irganox® range. In addition to the phenolic antioxidants cited above by way of example, it is also possible to use so-called co-stabilizers, in particular phosphorus- or sulfur-containing co-stabilizers. These phosphorus- or sulfur-containing co-stabilizers are known to those skilled in the art.

Examples of suitable flame retardants that may be used include the halogen-containing or phosphorus-containing compounds known to the person skilled in the art, magnesium hydroxide, and also other commonly used compounds, or mixtures thereof.

Examples of suitable light stabilizers include various substituted resorcinols, salicylates, benzotriazoles and benzophenones.

Suitable matting agents include not only inorganic substances such as talc, glass beads or metal carbonates (for example $MgCO_3$, $CaCO_3$) but also polymer particles, in particular spherical particles having diameters $D_{50}$ greater than 1 μm, based on, for example, methyl methacrylate, styrene compounds, acrylonitrile or mixtures thereof. It is further also possible to use polymers comprising copolymerized acidic and/or basic monomers.

Examples of suitable antidrip agents include polytetrafluoroethylene (Teflon) polymers and ultrahigh molecular weight polystyrene (weight-average molar mass Mw above 2,000,000).

Examples of fibrous/pulverulent fillers include carbon or glass fibers in the form of glass fabrics, glass mats, or filament glass rovings, chopped glass, glass beads, and wollastonite, particular preference being given to glass fibers. When glass fibers are used they may be finished with a sizing and a coupling agent to improve compatibility with the blend components. The glass fibers incorporated may either take the form of short glass fibers or else continuous filaments (rovings).

Examples of suitable particulate fillers include carbon black, amorphous silica, magnesium carbonate, powdered quartz, mica, bentonites, talc, feldspar or, in particular, calcium silicates, such as wollastonite, and kaolin.

Examples of suitable stabilizers include hindered phenols but also vitamin E/compounds having analogous structures and also butylated condensation products of p-cresol and dicyclopentadiene. HALS stabilizers (hindered amine light stabilizers), benzophenones, resorcinols, salicylates, benzotriazoles are also suitable. Other suitable compounds include, for example, thiocarboxylic esters. Also usable are $C_6$-$C_{20}$) alkyl esters of thiopropionic acid, in particular the stearyl esters and lauryl esters. It is also possible to use the dilauryl ester of thiodipropionic acid (dilauryl thiodipropionate), the distearyl ester of thiodipropionic acid (distearyl thiodipropionate) or mixtures thereof. Examples of further additives include HALS absorbers, such as bis(2,2,6,6-tetramethyl-4-piperidyl) sebacate or UV absorbers such as 2H-benzotriazol-2-yl-(4-methylphenol). Additional UV stabilizers, in particular HALS, may optionally support the stabilizing effect of one or more organopoylsiloxane compounds (B).

Suitable lubricants and demolding agents include stearic acids, stearyl alcohol, stearic esters, polyolefin waxes and/or generally higher fatty acids, derivatives thereof and corresponding fatty acid mixtures comprising 1 to 45 carbon atoms. In a further preferred embodiment the composition comprises amide compounds having the formula R¹—CONH—R², wherein R¹ and R² are each independently selected from aliphatic, saturated or unsaturated hydrocarbon groups having 1 to 30 carbon atoms, preferably 12 to 24 carbon atoms, in particular 16 to 20 carbon atom. In a further preferred embodiment of the invention, the composition may additionally comprise fatty acid ester compounds having the formula R³—CO—OR⁴, wherein R³ and R⁴ are each independently selected from aliphatic, saturated or unsaturated hydrocarbon groups having 1 to 45 carbon atoms, preferably 15 to 40 carbon atoms, in particular 25 to 35 carbon atoms. Also particularly suitable is ethylene-bis (stearamide).

In a further preferred embodiment, the thermoplastic polymer composition (P) may comprise an organic, inorganic or mixed phosphate, in particular an alkaline metal or earth alkaline metal phosphate such as $Ca_3(PO_4)_2$ and/or an organophosphate having alkyl or aryl groups comprising 1 to 12 carbon atoms. These phosphates may be conveniently added in form of a masterbatch, e.g. in combination with polyolefin waxes and/or olefin/styrene copolymers.

In a further preferred embodiment, thermoplastic polymer composition (P) may further comprise a polyester modified polysiloxane, in particular a polyester-polysiloxane-block copolymer, preferably a [polyester-b-polysiloxane-b-polyester] triblock copolymer. Preferred examples of the polysiloxane moieties comprised in the polyester-polysiloxane-blockcopolymer are derived from poly(dimethylsiloxane), poly(diethylsiloxane), poly(dipropylsiloxane), poly(dibutylsiloxane), and mixtures thereof.

Molding Mass (P)

As the molding mass (P) of the present invention comprises at least one vinylaromatic component (as component (A-2) is based on one or more vinylaromatic copolymers), it may also be designated as "vinylaromatic molding mass".

In a preferred embodiment, the molding mass (P) comprises (or consists of):
 (A) 85 to 99.3 wt.-% of at least one thermoplastic polymer composition (A) comprising (or consisting of) at least one graft copolymer (A-1) and at least one thermoplastic matrix (A-2);
 (B) 0.5 to 5 wt.-% of at least one organopolysiloxane compound (B);
 (C) 0.1 to 5 wt.-% of one or more colorants, dyes or pigments (C); and
 (D) 0.1 to 5 wt.-% one or more further additives (D),
wherein the constituents (A) to (D) sum up to 100 wt.-% of the molding mass (P).

In a preferred embodiment, the molding mass (P) comprises (or consists of):
 (A) 85 to 99.3 wt.-% of at least one thermoplastic polymer composition (A) comprising (or consisting of):
 (A-1) 5 to 50 wt.-% (or 20 to 40 wt.-%), referred to the thermoplastic polymer composition (A), of at least one graft copolymer (A-1) comprising or consisting of an acrylonitrile styrene acrylate (ASA) having an average particle size $d_{50}$ of the rubber particles in the ASA copolymer from 50 to 1000 nm, wherein the average particle size is determined by scattered light measurement; and
 (A-2) 20 to 95 wt.-% (or 25 to 40 wt.-%), referred to the thermoplastic polymer composition (A), of at least one thermoplastic matrix (A-2) comprising 18 to 45 wt.-% of at least one vinyl cyanide, in particular acrylonitrile, and 55 to 82 wt.-% of at least one vinylaromatic, in particular an vinylaromatic selected from styrene and alpha-methylstyrene, and,
 (A-3) 0 to 75 wt.-% (or 40 to 55 wt.-%), referred to the thermoplastic polymer composition (A), of one or more additional thermoplastic polymers (A-3), in particular one or more additional thermoplastic polymers selected from the group consisting of polycarbonate (PC), polyamide (PA), and mixtures thereof.
 (B) 0.5 to 5 wt.-% of at least one organopolysiloxane compound (B);
 (C) 0.1 to 10 wt.-% of one or more colorants, dyes or pigments (C); and
 (D) 0.1 to 5 wt.-% one or more further additives (D),
wherein the constituents (A) to (D) sum up to 100 wt.-% of the molding mass (P).

In a preferred embodiment, the molding mass (P) does not comprise colloidal silica.

In a preferred embodiment, the molding mass (P) obtained by the method of the present invention bears at least one of the following:
 (a) a color shift of the molding mass (P) subjected to artificial weathering according to PV3929 after 2400 h of below 70%, preferably below 60%, of the color shift of a comparable molding mass (P) without an organopolysiloxane compound (B) subjected to artificial weathering according to PV3929 after 2400 h;
 (b) a color shift of the molding mass (P) subjected to artificial weathering according to PV3929 after 3200 h of below 65%, preferably below 60%, of the color shift of a comparable molding mass (P) without an organopolysiloxane compound (B) subjected to artificial weathering according to PV3929 after 3200 h;
 (c) a color shift of the molding mass (P) subjected to artificial weathering according to PV3930 after 2400 h of below 80%, preferably below 75%, of the color shift of a comparable molding mass (P) without an organopolysiloxane compound (B) subjected to artificial weathering according to PV3930 after 2400 h;
 (d) a color shift of the molding mass (P) subjected to artificial weathering according to PV3930 after 3200 h of below 25%, preferably below 20%, of the color shift of a comparable molding mass (P) without an organopolysiloxane compound (B) subjected to artificial weathering according to PV3930 after 3200 h; and/or
 (d) a greyscale of the molding mass (P) after 3200 h of weathering according to PV3930 of at least 1 unit, preferably at least 2 units, higher compared to a comparable molding mass (P) without an organopolysiloxane compound (B) subjected to the same artificial weathering.

In a preferred embodiment, the molding mass (P) obtained by the method of the present invention bears a greyscale of the molding mass (P) after 3200 h of weathering according to PV3930 of at least 1 unit, preferably at least 2 units, higher compared to a comparable molding mass (P) without an organopolysiloxane compound (B) subjected to the same artificial weathering and a color shift of the molding mass (P) subjected to artificial weathering according to PV3929 after 2400 h of below 70%, preferably below 60%, of the color shift of a comparable molding mass (P) without an organopolysiloxane compound (B) subjected to artificial weathering according to PV3929 after 2400 h.

In a preferred embodiment, the molding mass (P) comprises (or consists of):
 (A) 80 to 99.5 wt.-% of at least one thermoplastic polymer composition (A) comprising (or consisting of):
 (A-1) 5 to 50 wt.-% (or 20 to 40 wt.-%), referred to the thermoplastic polymer composition (A), of at least one graft copolymer (A-1) comprising or consisting of an acrylonitrile styrene acrylate (ASA) having an average particle size $d_{50}$ of the rubber particles in the ASA copolymer from 50 to 1000 nm, wherein the average particle size is determined by scattered light measurement; and (A-2) 20 to 95 wt.-% (or 25 to 40 wt.-%), referred to the thermoplastic polymer composition (A), of at least one thermoplastic matrix (A-2) comprising 18 to 45 wt.-% of at least one vinyl cyanide, in particular acrylonitrile, and 55 to 82 wt.-% of at least one vinylaromatic, in particular an vinylaromatic selected from styrene and alpha-methylstyrene, and, (A-3) 0 to 75 wt.-% (or 40 to 55 wt.-%), referred to the thermoplastic polymer composition (A), of one or more additional thermoplastic polymers (A-3), in particular one or more additional thermoplastic polymers selected from the group consisting of polycarbonate (PC), polyamide (PA), and mixtures thereof.

(B) 0.5 to 5 wt.-% of at least one organopolysiloxane compound (B);

(C) 0 to 10 wt.-% of one or more colorants, dyes or pigments (C); and (D) 0 to 5 wt.-% one or more further additives (D), wherein the constituents (A) to (D) sum up to 100 wt.-% of the molding mass (P), and wherein the molding mass (P) obtained by the method of claim 1 bears at least one of the following:

(a) a color shift of the molding mass (P) subjected to artificial weathering according to PV3929 after 2400 h of below 70%, preferably below 60%, of the color shift of a comparable molding mass (P) without an organopolysiloxane compound (B) subjected to artificial weathering according to PV3929 after 2400 h;

(b) a color shift of the molding mass (P) subjected to artificial weathering according to PV3929 after 3200 h of below 65%, preferably below 60%, of the color shift of a comparable molding mass (P) without an organopolysiloxane compound (B) subjected to artificial weathering according to PV3929 after 3200 h;

(c) a color shift of the molding mass (P) subjected to artificial weathering according to PV3930 after 2400 h of below 80%, preferably below 75%, of the color shift of a comparable molding mass (P) without an organopolysiloxane compound (B) subjected to artificial weathering according to PV3930 after 2400 h;

(d) a color shift of the molding mass (P) subjected to artificial weathering according to PV3930 after 3200 h of below 25%, preferably below 20%, of the color shift of a comparable molding mass (P) without an organopolysiloxane compound (B) subjected to artificial weathering according to PV3930 after 3200 h; and/or (d) a greyscale of the molding mass (P) after 3200 h of weathering according to PV3930 of at least 1 unit, preferably at least 2 units, higher compared to a comparable molding mass (P) without an organopolysiloxane compound (B) subjected to the same artificial weathering.

In a preferred embodiment, the molding mass (P) comprises (or consists of):

(A) 85 to 99.3 wt.-% of at least one thermoplastic polymer composition (A) comprising (or consisting of):

(A-1) 5 to 50 wt.-% (or 20 to 40 wt.-%), referred to the thermoplastic polymer composition (A), of at least one graft copolymer (A-1) comprising or consisting of an acrylonitrile styrene acrylate (ASA) having an average particle size $d_{50}$ of the rubber particles in the ASA copolymer from 50 to 1000 nm, wherein the average particle size is determined by scattered light measurement; and (A-2) 20 to 95 wt.-% (or 25 to 40 wt.-%), referred to the thermoplastic polymer composition (A), of at least one thermoplastic matrix (A-2) comprising 18 to 45 wt.-% of at least one vinyl cyanide, in particular acrylonitrile, and 55 to 82 wt.-% of at least one vinylaromatic, in particular an vinylaromatic selected from styrene and alpha-methylstyrene, and, (A-3) 0 to 75 wt.-% (or 40 to 55 wt.-%), referred to the thermoplastic polymer composition (A), of one or more additional thermoplastic polymers (A-3), in particular one or more additional thermoplastic polymers selected from the group consisting of polycarbonate (PC), polyamide (PA), and mixtures thereof.

(B) 0.5 to 5 wt.-% of at least one organopolysiloxane compound (B);

(C) 0.1 to 10 wt.-% of one or more colorants, dyes or pigments (C); and (D) 0.1 to 5 wt.-% one or more further additives (D), wherein the constituents (A) to (D) sum up to 100 wt.-% of the molding mass (P), and wherein the molding mass (P) obtained by the method of claim 1 bears a greyscale of the molding mass (P) after 3200 h of weathering according to PV3930 of at least 1 unit, preferably at least 2 units, higher compared to a comparable molding mass (P) without an organopolysiloxane compound (B) subjected to the same artificial weathering and optionally one of the following properties:

(a) a color shift of the molding mass (P) subjected to artificial weathering according to PV3929 after 2400 h of below 70%, preferably below 60%, of the color shift of a comparable molding mass (P) without an organopolysiloxane compound (B) subjected to artificial weathering according to PV3929 after 2400 h;

(b) a color shift of the molding mass (P) subjected to artificial weathering according to PV3929 after 3200 h of below 65%, preferably below 60%, of the color shift of a comparable molding mass (P) without an organopolysiloxane compound (B) subjected to artificial weathering according to PV3929 after 3200 h;

(c) a color shift of the molding mass (P) subjected to artificial weathering according to PV3930 after 2400 h of below 80%, preferably below 75%, of the color shift of a comparable molding mass (P) without an organopolysiloxane compound (B) subjected to artificial weathering according to PV3930 after 2400 h; and/or (d) a color shift of the molding mass (P) subjected to artificial weathering according to PV3930 after 3200 h of below 25%, preferably below 20%, of the color shift of a comparable molding mass (P) without an organopolysiloxane compound (B) subjected to artificial weathering according to PV3930 after 3200 h.

Preparation of the Molding Mass (P)

The method according of the present invention may have any procedural steps suitable for conducting the claimed method.

In a preferred embodiment, the step of compounding the components comprises at least the following steps:

(i) providing the components (A) to (D) in the predetermined amounts to an optionally heatable mixing device; and (ii) blending the components (A) to (D) in the optionally heatable mixing device at temperatures above the glass transition point of the components (A) to (D) to obtain the molding mass (P).

Optionally, a step in which a homogenous particulate material mixture is prepared from the components (A) to (D) may be carried out prior to step (ii). However, also when provided to the optionally heatable mixing device without previous mixing, a homogenous mixing is typically achieved in the optionally heatable mixing device.

Each of components (A) to (D)—as far as solid—may be provided in form of particulate materials having different particle sizes and particle size distributions (e.g., as pellets, granules and/or powders).

The particulate materials (A) to (D) may be provided to a mixing device in the required amounts and ratios as previously indicated and optionally mixed prior to the blending step (ii) in order to obtain a homogenous particulate material mixture. In a preferred embodiment, this may require 1 to 60, preferably 1 to 20, in particular 2 to 10 minutes, depending to the amount of particulate material to be mixed.

The thus obtained homogenous particulate material mixture is then transferred to an optionally heatable mixing apparatus and blended therein, producing a substantially liquid-melt polymer mixture.

"Substantially liquid-melt" means that the polymer mixture, as well as the predominant liquid-melt (softened) fraction, may further comprise a certain fraction of solid constituents, examples being unmelted fillers and reinforcing material such as glass fibers, metal flakes, or else unmelted pigments, colorants, etc. "Liquid-melt" means that the polymer mixture is at least of low fluidity, therefore having softened at least to an extent that it has plastic properties.

Mixing apparatuses used are those known by the person skilled in the art. Components (A) and (B), and—where included—(C) and/or (D) may be mixed, for example, by joint extrusion, kneading, or rolling, the aforementioned components necessarily having been isolated from the aqueous dispersion or from the aqueous solution obtained in the polymerization.

Examples of mixing apparatus for implementing the method include discontinuously operating, heated internal kneading devices with or without RAM, continuously operating kneaders, such as continuous internal kneaders, screw kneaders with axially oscillating screws, Banbury kneaders, furthermore extruders, and also roll mills, mixing roll mills with heated rollers, and calenders.

Optionally, the method may comprise a further step (iii) of cooling the blend obtained from step (ii) to temperatures below the glass transition point of the components (A) to (D) to obtain the molding mass (P).

A preferred mixing apparatus used is an extruder or a kneader. Particularly suitable for melt extrusion are, for example, single-screw or twin-screw extruders. A twin-screw extruder is preferred. In some cases the mechanical energy introduced by the mixing apparatus in the course of mixing is enough to cause the mixture to melt, meaning that the mixing apparatus does not have to be heated. Otherwise, the mixing apparatus is generally heated.

The temperature is guided by the chemical and physical properties of the styrene-based polymer composition (A) and the organopolysiloxane compound (B) and—when present—the colorant or colorant master batch (C) and/or the further additives (D), and should be selected such as to result in a substantially liquid-melt polymer mixture. On the other hand, the temperature is not to be unnecessarily high, in order to prevent thermal damage of the polymer mixture. The mechanical energy introduced may, however, also be high enough that the mixing apparatus may even require cooling. Mixing apparatus is operated customarily at 150 to 400, preferably 170 to 300° C.

In a preferred embodiment, a heatable twin-screw extruder and a speed of 50 to 150 rpm, preferably 60 to 100 rpm is employed. In a preferred embodiment, an extruding temperature of 170 to 270° C., preferably 210 to 250° C. is employed to obtain the molding mass (P). The molding mass (P) may be directly used, e.g. in molding processes, preferably injection molding processes, or may be processed to form granules which may be subjected to molding processes afterwards. The molding processes are preferably carried out at temperatures of 170 to 270° C., in particular 210 to 250° C. to result in a molded article.

Processing may be carried out using the known processes for thermoplastic processing, in particular production may be effected by thermoforming, extruding, injection molding, calendaring, blow molding, compression molding, press sintering, deep drawing or sintering, preferably by injection molding.

As indicated above, the molding mass (P) of the present invention is particularly UV resistant and bears good mechanical properties. Accordingly, a further aspect of the present invention relates to a molding mass (P) obtainable from the method of the present invention.

Further, a still further aspect of the present invention relates to a molding mass (P) comprising (or consisting of):
(A) 80 to 99.5 wt.-% of at least one thermoplastic polymer composition (A) comprising (or consisting of):
(A-1) 5 to 50 wt.-% (or 20 to 40 wt.-%), referred to the thermoplastic polymer composition (A), of at least one graft copolymer (A-1) comprising or consisting of an acrylonitrile styrene acrylate (ASA) having an average particle size $d_{50}$ of the rubber particles in the ASA copolymer from 50 to 1000 nm, wherein the average particle size is determined by scattered light measurement; and
(A-2) 20 to 95 wt.-% (or 25 to 40 wt.-%), referred to the thermoplastic polymer composition (A), of at least one thermoplastic matrix (A-2) comprising 18 to 45 wt.-% of at least one vinyl cyanide, in particular acrylonitrile, and 55 to 82 wt.-% of at least one vinylaromatic, in particular an vinylaromatic selected from styrene and alpha-methylstyrene, and,
(A-3) 0 to 75 wt.-% (or 40 to 55 wt.-%), referred to the thermoplastic polymer composition (A), of one or more additional thermoplastic polymers (A-3), in particular one or more additional thermoplastic polymers selected from the group consisting of polycarbonate (PC), polyamide (PA), and mixtures thereof.
(B) 0.5 to 5 wt.-% of at least one organopolysiloxane compound (B);
(C) 0 to 10 wt.-% of one or more colorants, dyes or pigments (C); and
(D) 0 to 5 wt.-% one or more further additives (D),
wherein the constituents (A) to (D) sum up to 100 wt.-% of the molding mass (P), and wherein the molding mass (P) obtained by the method of claim 1 bears at least one of the following:
(a) a color shift of the molding mass (P) subjected to artificial weathering according to PV3929 after 2400 h of below 70%, preferably below 60%, of the color shift of a comparable molding mass (P) without an organopolysiloxane compound (B) subjected to artificial weathering according to PV3929 after 2400 h;
(b) a color shift of the molding mass (P) subjected to artificial weathering according to PV3929 after 3200 h of below 65%, preferably below 60%, of the color shift of a comparable molding mass (P) without an organopolysiloxane compound (B) subjected to artificial weathering according to PV3929 after 3200 h;
(c) a color shift of the molding mass (P) subjected to artificial weathering according to PV3930 after 2400 h of below 80%, preferably below 75%, of the color shift of a comparable molding mass (P) without an organopolysiloxane compound (B) subjected to artificial weathering according to PV3930 after 2400 h;
(d) a color shift of the molding mass (P) subjected to artificial weathering according to PV3930 after 3200 h of below 25%, preferably below 20%, of the color shift of a comparable molding mass (P) without an organopolysiloxane compound (B) subjected to artificial weathering according to PV3930 after 3200 h; and/or
(d) a greyscale of the molding mass (P) after 3200 h of weathering according to PV3930 of at least 1 unit, preferably at least 2 units, higher compared to a comparable molding mass (P) without an organopolysiloxane compound (B) subjected to the same artificial weathering.

It will be understood that the definitions and preferred embodiments as laid out in the context of the method before, mutatis mutandis apply to the molding mass (P) as such. Furthermore, as the molding mass (P) bears beneficial characteristics, also an article, in particular a molded article will bear such beneficial characteristics such as UV resistance and maintain mechanical properties. Accordingly, a still further aspect of the present invention relates to an article, in particular a molded article, prepared from a molding mass (P) according to the present invention.

It will be understood that the definitions and preferred embodiments as laid out in the context of the method and molding mass (P) before, mutatis mutandis apply to the article, in particular the molded article, of the present invention.

The present invention further relates to an article, in particular a molded article, prepared from a molding mass (P) or a polymer composition, comprising a molding mass (P) in combination with a further thermoplastic polymer as described above. The article, in particular the molded article, may be prepared by any known processes for thermoplastic processing. In particular preparation may be effected by thermoforming, extruding, injection molding, calendaring, blow molding, compression molding, press sintering, deep drawing or sintering, preferably by injection molding.

The molding mass (P) and the article, in particular the molded article, may be advantageously used for the manufacture of components or articles for electronic devices, household goods and exterior and/or interior automotive parts, in particular for the manufacture of visible components or articles. A preferred application is the use in A/B/C pillars of automobiles.

As indicated above, the present invention relates to improving UV resistance of a molding mass by means of an organopolysiloxane compound (B). Accordingly, a still further aspect of the present invention relates to the use of an organopolysiloxane compound for improving UV resistance of a molding mass.

It will be understood that the definitions and preferred embodiments as laid out in the context of the method and molding mass (P) before, mutatis mutandis apply to the use of the present invention.

In a preferred embodiment, the organopolysiloxane compound is defined as laid out above. In a preferred embodiment, the molding mass comprises a thermoplastic polymer composition (A) as defined above. In a preferred embodiment, the organopolysiloxane compound is defined as laid out above and the molding mass comprises a thermoplastic polymer composition (A) as defined above. In a preferred embodiment, the molding mass is a molding mass (P) characterized as defined above.

The invention is further illustrated by the claims and examples.

EXAMPLES

Components

Component A: The thermoplastic polymer composition (A) is an acrylonitrile styrene acrylate (ASA), i.e., an impact modified poly(styrene-acrylonitrile) (SAN) comprising SAN grafted on a butyl acrylate (BA) core (BA-g-SAN) with the below-specified properties.

Component B1: The polysiloxane constituent (B1) was provided in form of a master batch (MB) comprising 50 wt.-% of a ultra-high molecular weight siloxane polymer dispersed in a poly(styrene-acrylonitrile) (SAN) carrier. The master batch (MB) is commercially available (Dow Corning® MB50-008 Masterbatch). MB50-008 may be used as poly(dimethylsiloxane) (PDMS) dispersed in SAN.

Component B2: The polysiloxane constituent (B2) was provided in form of a liquid component having a viscosity (25° C.) of 950 to 2000 mPas. It is commercially available from Evonik Nutrition & Care GmbH (Tegomer® Antiscratch L). The molecular weight (mass mean, Mw) was determined with GPC (solvent: THF) to be 39.311 kDa (relative to a polystyrene standard). Tegomer® Antiscratch L is an organically modified polysiloxane (poly(dimethylsiloxane), PDMS) containing vinyl and methoxy groups.

Component C1: Bis(2-propylheptyl)phthalate (DPHP) is a plastisizer.

Component C2: Polyethylene wax may be used as lubricant.

Component C3: Bis(2,2,6,6-tetramethyl-4-piperidyl)sebacat is a UV stabilizer of the group of hindered amine light stabilizer (HALS) obtainable from BASF, Germany.

Component C4: CYASORB® UV-3853 Series is a hindered amine light stabilizer (HALS) obtainable from Cytec Solvay Group.

Component C5: an aliphatic fatty acid ester composition having a melting point of 42-50° C., and a density 0.92 g/cm$^3$ (e.g. commercially available IncroMax® 100 from Croda International, UK.

Component D1: Carbon black is used as black pigment.

Basic Rubber Latex L1:

The reaction vessel was charged with 90.2 parts of demineralized water, 0.61 parts of the sodium salt of a C12- to C18-paraffin sulfonic acid and 0.23 parts sodium bicarbonate. When the temperature in the reaction vessel reached 59° C., 0.16 parts of sodium persulfate, dissolved in 5 parts of demineralized water, were added. A mixture of 59.51 parts butyl acrylate and 1.21 parts tricyclodecenyl acrylate were added within a period of 210 min. Afterwards the reaction was continued for 60 min. Finally the polymer dispersion had a total solid content of 39.6% and the latex particles had a particle diameter of 75 nm (determined by turbidity).

Graft Rubber Latex (Component A-1a):

An amount of 151.9 parts of the basic latex were added to the reaction vessel together with 92.2 parts of demineralized water and 0.14 parts of sodium persulfate, dissolved in 3.22 parts of demineralized water. Within a period of 190 min a mixture of 31.18 parts of styrene and 9.31 parts of acrylonitrile were added at a temperature of 61° C., followed by a post polymerization time of 60 min at 65° C. A polymer dispersion with a total solid content of 35.5% was obtained. The latex particles had a diameter 87 nm (determined by turbidity). After synthesis, the latex was coagulated with magnesium sulfate solution at a temperature of approximately 60° C., followed by a sintering step at approximately 90° C. The resulting slurry was centrifuged yielding a wet rubber powder which was further processed.

Basic Rubber Latex L2:

The reaction vessel was charged with 70.66 parts of demineralized water, 0.3 parts of latex L1 and 0.23 parts of sodium bicarbonate. After heating the reaction vessel to 60° C., 0.16 parts of sodium persulfate, dissolved in 5 parts demineralized water, were added to the reaction mixture. A mixture of 59.51 parts butyl acrylate and 1.21 parts tricyclodecenyl acrylate were added within a period of 210 min. In parallel to the first feed a solution of 0.36 parts of the sodium salt of a C12- to C18-paraffin sulfonic acid in 16.6 parts demineralized water were also added over a period of 210 min. After 200 min, from starting the feed, the temperature is ramped to 65° C.

Afterwards the reaction was continued for 60 min at 65° C. Finally the polymer dispersion had a total solid content of 39.4% and the latex particles have a particle diameter of 440 nm (determined by turbidity).

Graft Rubber Latex (Component A-1b):

An amount of 154 parts of the basic latex were added to the reaction vessel together with 88.29 parts of demineralized water, 0.11 parts of the sodium salt of a C12- to C18-paraffin sulfonic acid and 0.14 parts of sodium persulfate, dissolved in 5.61 parts of demineralized water. The reaction mixture was heated to 61° C. Within a period of 60 min 13.16 parts are added at a temperature of 61° C., followed by a post polymerization time of 90 min, where the temperature was increased from 61 to 65° C. Then a mixture of 20.5 parts of styrene and 6.83 parts of acrylonitrile were added to the reaction over a period of 150 min. The reaction was continued at 65° C. for another 60 min. A polymer dispersion with a total solid content of 35.2% was obtained. The latex particles had a diameter 500 nm (determined by turbidity). After synthesis the latex was coagulated with magnesium sulfate solution at a temperature of approximately 88° C., followed by a sintering step at approximately 130° C. The resulting slurry was centrifuged yielding a wet rubber powder which was further processed.

Experimental Procedure

TABLE 1

| Compounding Recipes | | | |
|---|---|---|---|
| Components in wt.-% | Comp. Ex. 1 | Ex. 1 | Ex. 2 |
| A-1a: 90 nm, BA-g-SAN | 19.32 | 18.84 | 18.93 |
| A-1b: 500 nm, BA-g-SAN | 12.75 | 12.43 | 12.50 |
| A-2a: AMSAN (30 wt.-% ACN, 70 wt.-% a-Methylstyrene, VZ 57 ml/g) | 23.64 | 23.05 | 23.16 |
| A-2b: SAN (35% ACN, VZ 80 ml/g) | 33.14 | 32.31 | 32.47 |
| B1: Organopolysiloxane MB50-008 as 50% MB in SAN (siloxane content) | | 2 (1) | |
| B2: Organopolysiloxane Tegomer Anti-Scratch L | | | 2 |
| C1: Plasticizer DPHP | 0.05 | 0.05 | 0.05 |
| C2: Polyethylene Wax | 0.34 | 0.33 | 0.33 |
| C3: Tinuvin 770 | 0.48 | 0.47 | 0.48 |

TABLE 1-continued

| Compounding Recipes | | | |
|---|---|---|---|
| Components in wt.-% | Comp. Ex. 1 | Ex. 1 | Ex. 2 |
| C4: Cyasorb 3853 as 50% MB in polypropylene (Cyasorb content) | 0.58 (0.29) | 0.57 (0.29) | 0.57 (0.29) |
| C5: Incromax 100 | | 0.5 | |
| D1: Carbon black (as 20 wt.-% MB in SAN) | 9.70 | 9.46 | 9.51 |

Herein, each BA-g-SAN (i.e., components A-1a and A-1b) comprises approximately 60 parts n-butyl acrylate (BA) containing a cross-linking agent, approximately 40 parts SAN (mass ratio styrene:acrylonitrile 1:3 to 1:4), and approximately 1 part of a further monomer such as, e.g., dihydrodicyclopentadienyl acrylate (DCPA) or tricyclodecenyl acrylate.

Sample Preparation

The sample according to Example 1 was prepared by compounding constituents A and B using a twin screw extruder (model ZSK26MC, Coperion GmbH, length: 1035 mm) at Tm=240° C. according to the specific ratios given in Table 1. DIN A5 samples (approximately 14.8×21.0 cm) have been prepared via injection molding (Tm: 242° C.).

Weathering Conditions

PV 3929 (simulation of dry hot climate):

black standard 90±2° C. (dry phase: 50±2° C.), relative humidity: 20±10%;

irradiation: 0.6 W/m$^2$ at a wavelength of 340 nm;

apparatus: Weather-O-meter Ci35A evaluation: grey scale according to EN 20105 A02; color measurement according to DIN 6174; Yellowness Index according to DIN 6167;

PV 3930 (simulation of moist warm climate):

black standard 65±2° C. (dry phase: 35-45° C.), relative humidity: 70±10%;

irradiation: 0.51 W/m$^2$ at 340 nm (alternatively 60 W/m$^2$ at a wavelength of 300-400 nm); according to ISO 4892-2;

apparatus: Weather-O-meter Ci5000;

evaluation: grey scale according to EN 20105 AO2; color measurement according to DIN 6174; Yellowness Index according to DIN 6167;

Evaluation units of greying: 1: strong greying; 2: greying; 3: some greying; 4: slight greying; 5: essentially no greying Results It has been surprisingly found that addition of an organopolysiloxane component (B) to a thermoplastic resin composition (e.g. ASA) significantly increases weatherability. According to the results in Table 2 the color shift (dE) after 3200 h of artificial weathering according to PV3929 of an inventive sample is significantly lower than of the color shift of a non-inventive sample lacking component (B). A similar result is found for PV3930; here the color shift is reduced by significantly compared to a non-inventive sample lacking component (B). Besides color shift, Greyscale after weathering is also a property of interest. The results in Table 3 show that for an inventive sample Greyscale after 3200 h of artificial weathering according to PV3930 is at least 2 units higher compared to a non-inventive sample lacking component (B).

TABLE 2

Color Shift upon artificial weathering according to PV3929 and PV3930

| Color Shift | Comp. Ex. 1 | Ex. 1 | Ex. 2 |
|---|---|---|---|
| B1: Organopolysiloxane MB50-008 | — | 2 | |
| B2: Organopolysiloxane Tegomer Anti-Scratch L | — | | 2 |
| PV 3929 | | | |
| 2400 h | 6.5 | 3.1 | 1.1 |
| 3200 h | 13.9 | 8.1 | 0.7 |
| PV 3930 | | | |
| 2400 h | 4.6 | 3.6 | 0.8 |
| 3200 h | 19 | 2.2 | 0.6 |

TABLE 3

Greyscale over time for artificial weathering according to PV3930

| Greyscale | Comp. Ex. 1 | Ex. 1 | Ex. 2 |
|---|---|---|---|
| B1: Organopolysiloxane MB50-008 | — | 2 | |
| B2: Organopolysiloxane Tegomer Anti-Scratch L | — | | 2 |
| PV 3930 | | | |
| 0 h | 5 | 5 | 5 |
| 3200 h | 1 to 2 | 3 to 4 | 3 to 4 |

The invention claimed is:

1. A method for improving UV resistance of a molding mass (P) comprising an organopolysiloxane compound (B) in comparison to a comparable molding mass (P) without the organopolysiloxane compound (B) subjected to the same artificial weathering, wherein the method comprises the step of compounding the following components with each other to make the molding mass (P):
   (A) 80 to 99.5 wt.-% of at least one thermoplastic polymer composition (A) comprising:
      (A-1) at least one graft copolymer (A-1); and
      (A-2) at least one thermoplastic matrix (A-2) based on at least one vinylaromatic copolymer;
   (B) 0.5 to 5 wt.-% of at least one organopolysiloxane compound (B);
   (C) 0 to 10 wt.-% of at least one colorant, dye, or pigment (C); and
   (D) 0 to 5 wt.-% at least one additive (D),
   wherein the constituents (A) to (D) sum up to 100 wt.-% of the molding mass (P), wherein the molding mass (P) has at least one of the following:
   (a) a color shift of the molding mass (P) subjected to artificial weathering according to PV3929 after 2400 h of below 70% of the color shift of a comparable molding mass (P) without an organopolysiloxane compound (B) subjected to artificial weathering according to PV3929 after 2400 h;
   (b) a color shift of the molding mass (P) subjected to artificial weathering according to PV3929 after 3200 h of below 65% of the color shift of a comparable molding mass (P) without an organopolysiloxane compound (B) subjected to artificial weathering according to PV3929 after 3200 h;
   (c) a color shift of the molding mass (P) subjected to artificial weathering according to PV3930 after 2400 h of below 80% of the color shift of a comparable molding mass (P) without an organopolysiloxane compound (B) subjected to artificial weathering according to PV3930 after 2400 h;
   (d) a color shift of the molding mass (P) subjected to artificial weathering according to PV3930 after 3200 h of below 25% of the color shift of a comparable molding mass (P) without an organopolysiloxane compound (B) subjected to artificial weathering according to PV3930 after 3200 h; and/or
   (e) a greyscale of the molding mass (P) after 3200 h of weathering according to PV3930 of at least 1 unit higher compared to a comparable molding mass (P) without an organopolysiloxane compound (B) subjected to the same artificial weathering.

2. The method of claim 1, wherein the at least one graft copolymer (A-1) comprises an acrylonitrile styrene acrylate (ASA) having an average particle size $d_{50}$ of rubber particles in the ASA copolymer from 50 to 1000 nm, wherein the average particle size is determined by scattered light measurement.

3. The method of claim 1, wherein the at least one thermoplastic matrix (A-2) comprises a copolymer which contains at least one vinyl cyanide and at least one vinylaromatic.

4. The method of claim 1, wherein the at least one thermoplastic polymer composition (A) comprises at least one copolymer (A-2) comprising:
   18 to 45 wt.-% of at least one vinyl cyanide; and
   55 to 82 wt.-% of at least one vinylaromatic.

5. The method of claim 1, wherein the at least one thermoplastic polymer composition (A) comprises:
   (A-1) 5 to 50 wt.-%, based on the thermoplastic polymer composition (A), of at least one graft copolymer (A-1) comprising or consisting of an acrylonitrile styrene acrylate (ASA) having an average particle size $d_{50}$ of rubber particles in the ASA copolymer from 50 to 1000 nm, wherein the average particle size is determined by scattered light measurement;
   (A-2) 20 to 95 wt.-%, based on the thermoplastic polymer composition (A), of at least one thermoplastic matrix (A-2) comprising 18 to 45 wt.-% of at least one vinyl cyanide and 55 to 82 wt.-% of at least one vinylaromatic; and
   (A-3) 0 to 75 wt.-%, v the thermoplastic polymer composition (A), of at least one additional thermoplastic polymer (A-3).

6. The method of claim 1, wherein the graft copolymer (A-1) comprises a binary or trinary size distribution comprising:
   (A-1a) at least one graft copolymer (A-1a) having an average particle size $d_{50}$ of rubber particles in the ASA copolymer from 50 to 150 nm; and
   (A-1b) at least one graft copolymer (A-1b) having an average particle size $d_{50}$ of rubber particles in the ASA copolymer from 200 to 750 nm.

7. The method of claim 5, wherein the graft copolymer (A-1) comprises a binary or trinary size distribution comprising:
   (A-1a) at least one graft copolymer (A-1a) having an average particle size $d_{50}$ of rubber particles in the ASA copolymer from 50 to 150 nm; and
   (A-1b) at least one graft copolymer (A-1b) having an average particle size $d_{50}$ of rubber particles in the ASA copolymer from 200 to 750 nm.

8. The method of claim 1, wherein the at least one organopolysiloxane compound (B) comprises repeating units having the following formula (I):

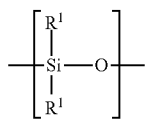 (I)

wherein each $R^1$ is independently selected from a linear or branched, saturated or unsaturated hydrocarbon group having 1 to 10 carbon atoms.

9. The method of claim 1, wherein the step of compounding the components comprises at least the following steps:
   (i) providing the components (A) to (D) in predetermined amounts to a mixing device; and
   (ii) blending the components (A) to (D) in the mixing device at temperatures above the glass transition point of the components (A) to (D) to obtain the molding mass (P).

10. The method of claim 1, wherein the molding mass (P) comprises:
    (A) 85 to 99.3 wt.-% of at least one thermoplastic polymer composition (A) comprising at least one graft copolymer (A-1) and at least one thermoplastic matrix (A-2);
    (B) 0.5 to 5 wt.-% of at least one organopolysiloxane compound (B);
    (C) 0.1 to 5 wt.-% of at least one colorant, dye, or pigment (C); and
    (D) 0.1 to 5 wt.-% at least one further additive (D),
    wherein the constituents (A) to (D) sum up to 100 wt.-% of the molding mass (P).

11. A molding mass (P) obtainable from the method of claim 1.

12. A molding mass (P) comprising:
    (A) 80 to 99.5 wt.-% of at least one thermoplastic polymer composition (A) comprising:
       (A-1) 5 to 50 wt.-%, based on the thermoplastic polymer composition (A), of at least one graft copolymer (A-1) comprising or consisting of an acrylonitrile styrene acrylate (ASA) having an average particle size $d_{50}$ of rubber particles in the ASA copolymer from 50 to 1000 nm, wherein the average particle size is determined by scattered light measurement;
       (A-2) 20 to 95 wt.-%, based on the thermoplastic polymer composition (A), of at least one thermoplastic matrix (A-2) comprising 18 to 45 wt.-% of at least one vinyl cyanide and 55 to 82 wt.-% of at least one vinylaromatic; and
       (A-3) 0 to 75 wt.-%, based on the thermoplastic polymer composition (A), of at least one additional thermoplastic polymer (A-3);
    (B) 0.5 to 5 wt.-% of at least one organopolysiloxane compound (B);
    (C) 0 to 10 wt.-% of at least one colorant, dye, or pigment (C); and
    (D) 0 to 5 wt.-% at least one additive (D),
    wherein the constituents (A) to (D) sum up to 100 wt.-% of the molding mass (P),
    and wherein the molding mass (P) has at least one of the following:
    (a) a color shift of the molding mass (P) subjected to artificial weathering according to PV3929 after 2400 h of below 70% of the color shift of a comparable molding mass (P) without an organopolysiloxane compound (B) subjected to artificial weathering according to PV3929 after 2400 h;
    (b) a color shift of the molding mass (P) subjected to artificial weathering according to PV3929 after 3200 h of below 65% of the color shift of a comparable molding mass (P) without an organopolysiloxane compound (B) subjected to artificial weathering according to PV3929 after 3200 h;
    (c) a color shift of the molding mass (P) subjected to artificial weathering according to PV3930 after 2400 h of below 80% of the color shift of a comparable molding mass (P) without an organopolysiloxane compound (B) subjected to artificial weathering according to PV3930 after 2400 h;
    (d) a color shift of the molding mass (P) subjected to artificial weathering according to PV3930 after 3200 h of below 25% of the color shift of a comparable molding mass (P) without an organopolysiloxane compound (B) subjected to artificial weathering according to PV3930 after 3200 h; and/or
    (e) a greyscale of the molding mass (P) after 3200 h of weathering according to PV3930 of at least 1 unit higher compared to a comparable molding mass (P) without an organopolysiloxane compound (B) subjected to the same artificial weathering.

13. An article prepared from the molding mass (P) of claim 11.

14. An article prepared from the molding mass (P) of claim 12.

15. The method of claim 9, wherein the mixing device is heatable.

* * * * *